United States Patent [19]

Brooke

[11] Patent Number: 4,996,673
[45] Date of Patent: Feb. 26, 1991

[54] UNDERWATER CONTROL SYSTEM

[75] Inventor: John Brooke, Halifax, Canada

[73] Assignee: Her Majesty the Queen in right of Canada, as represented by the Minister of Energy, Mines & Resources, Ottawa, Canada

[21] Appl. No.: 539,892

[22] Filed: Jun. 18, 1990

[30] Foreign Application Priority Data

Jul. 18, 1989 [CA] Canada ................... 605989

[51] Int. Cl.⁵ .............................................. G01S 15/00
[52] U.S. Cl. ....................................... 367/131; 367/88
[58] Field of Search ............... 367/104, 106, 130, 131, 367/88, 7; 114/312, 330, 337; 180/131

[56] References Cited

U.S. PATENT DOCUMENTS 2,980,052  4/1961  Fehlner ............................. 367/106
3,256,539  6/1966  Clark ................................ 367/130

Primary Examiner—Thomas H. Tarcza
Assistant Examiner—Daniel T. Pihulic
Attorney, Agent, or Firm—Yoshiharu Toyooka

[57] ABSTRACT

An underwater control system is disclosed. The system find particular applications in mosaic photographic and/or acoustic mapping of seabed or such marine studies, explorations, etc. A submersible vehicle is tied to a fixed central unit by a tether. The tether winds and unwinds as the vehicle travels in a spiral path, thus covering all the areas of seabed. The vehicle includes a plurality of vertical wings to generate necessary forces to keep the tether taut. In one embodiment, the vertical wings are designed to generate a lift to maintain a substantially constant altitude. In another embodiment, an altitude control device is provided.

11 Claims, 3 Drawing Sheets

UNDERWATER CONTROL SYSTEM

FIELD OF THE INVENTION

The present invention relates generally to a control system which regulate the movement of a submersible vehicle under water relative to a fixed location. More specifically, the present invention relates to a control system which includes survey instruments provided on the vehicle so that survey can be carried out at controlled locations as the vehicle travels under water in a substantially spiral path.

BACKGROUND OF THE INVENTION

In marine studies or other activities involving such bodies of water as seas, lakes, rivers, etc, submersible vehicles are often used. In order to obtain samples at exact locations, it is necessary to move the vehicle accurately relative to the floor of the body of water, especially if that vehicle is a remote controlled vehicle (R.O.V.). It is however very difficult to precisely control the movement of such vehicle under water. Particularly so, if there are water currents or other disturbances. In particular there is a requirement for a simple method to take a matched series of photographs of the ocean floor or the like, thereby producing a picture of larger areas of the ocean floor than is presently possible with single frame shot. It is therefore required to produce a mosaic assembly of photographs, similar to, but smaller than those made over land masses by aircraft.

The present way of accomplishing an underwater mosaic is to relate the position of a single frame photograph to a previously established acoustic beacon "lanes" on the ocean bed. Photographs are then taken from a camera assembly that is "flown" close to the ocean bed by towing from a surface ship. The developed photographs are then assembled by relating the position of the frames to previously recorded acoustic data within each "lane". Overlap of each related frames and "lanes" must take place to achieve full coverage. The most difficult problem is keeping the camera in a straight path and at the correct height. Because the camera platform (or support) is towed at a considerable distance from the ship and by a flexible connection (cable or wire), lateral and vertical movement of the camera does take place, thereby distorting the overlaps and photograph size. Most importantly is the fact that the extent of "wondering" is only known after the swing by assembly.

Canadian Pat. No. 892,351 Feb. 8, 1972 (Dessureault) teaches one of many improvements in stabilizing an underwater towed body. THe patent describes pivotally mounted rudders under gravity influence which maintain the towed body at a constant elevation or in a stable vertical plane relative to the towing device.

Another practice of using a bottom sledge platform does generally overcome the altitude problem but due to bottom obstructions it does not prevent lateral movement. Therefore the acoustic marker will give knowledge of the position where the camera has taken photographs, but there is no guarantee that overlap has taken place. In practice, total complete overlap between "lanes" is rarely achieved. A way of overcoming this limitation is to equip the towed body with side thrusters and linking the control of the thrusters to the acoustic marker's position so that "lane wandering" is automatically corrected: similar to automatic blind landing techniques sued by aircraft. Obviously it would become a very expensive and complex system.

While these methods and techniques, with the right environmental factors at the site, and better than average success, will produce a relatively large area mosaic (several hundred feet long), the methods are rarely used due to the expense and cost in time. THere is, however, a greater demand for the production of mosaics in relatively smaller areas at special sites such as oil production areas, bottom investigation of iceberg scours and sand waves, and marine biology and archaeology sites.

OBJECT OF THE INVENTION

It is therefore an object of the present invention to provide an underwater control system for controlling the movement of a submersible vehicle relative to a central unit fixed on the floor of a body of water.

It is another object of the present invention to provide an underwater control system in which a submersible vehicle has a plurality of vertical wings.

It is yet another object of the present invention to provide an underwater control system in which a central unit has a metered drum on which a tether connecting the central unit and the submersible vehicle can be wound and unwound.

It is further an object of the present invention to provide an underwater control system in which the submersible vehicle is tethered to travel in a substantially spiral path.

It is still a further object of the present invention to provide an underwater control system in which the submersible vehicle is tethered to travel in a substantially spiral path and at a substantially constant altitude above the floor.

SUMMARY OF THE INVENTION

Briefly stated, an underwater control system for controlling the movement in a body of water of a submersible vehicle relative to a central unit comprises the central unit which includes anchoring means for fixedly placing the central unit on the floor of the body of water. The central unit further has a metering drum having a predetermined circumference. The control system includes further a tether to be wound and unwound about the drum and having one end attached thereto. The submersible vehicle, on the other hand, is connected to the other end of the tether for travelling in water in a substantially spiral path about the central unit as the tether winds and unwinds. The vehicle includes propelling means and a plurality of vertical wings to generate an outward force onto the vehicle to maintain the tether taut so that the vehicle travels in the substantially spiral path over the floor.

BRIEF DESCRIPTION OF DRAWINGS

For more complete understanding of the present invention and for further objects and advantages thereof, references may be made to the following description taken in conjunction with the accompanying drawings in which.

DETAILED DESCRIPTION OF PREFERRED EMBODIMENTS

Figure 1:
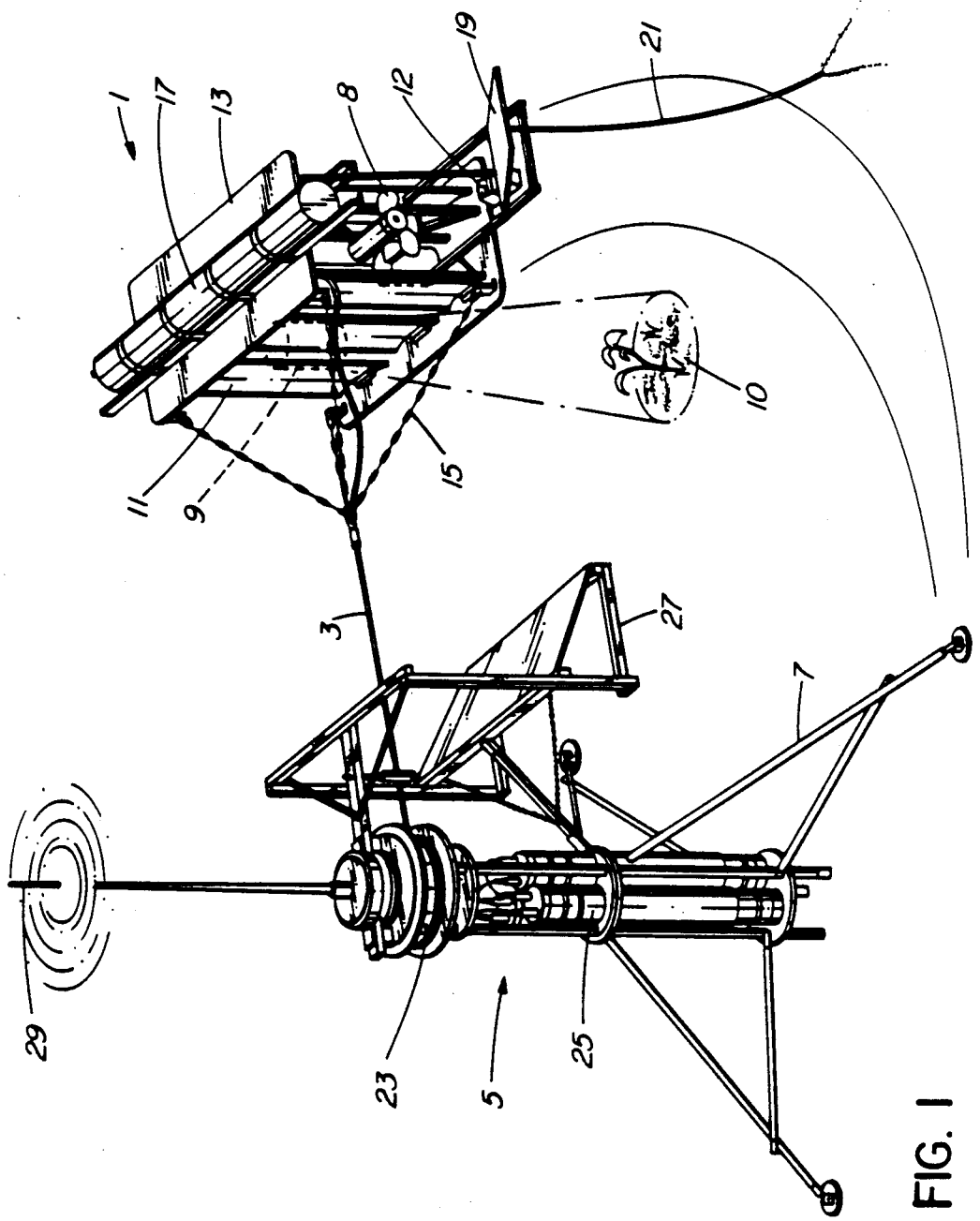
FIG. 1 is a perspective and schematic illustration of an underwater control system according to one embodiment of the present invention.

FIG. 1 illustrates schematically one of preferred embodiments of the present invention. A submersible vehicle 1 is restrained by a tether 3 to a central unit 5 which is anchored by tripod 7 onto the seabed. The vehicle 1 carries on it a thruster 8 a camera 9, and if required, a light source 12 to illuminate the ocean floor. Any appropriate instrument, such as video or echo sounder, can replace the camera or can be added to it. In this embodiment, the camera takes series of photographs of the ocean floor 10 as the vehicle travels under water in a substantially spiral path about the central unit 5. A plurality of vertical wings 11 are provided between a pair of end plates. Three vertical wings in two rows are used in this embodiment but other numbers and configurations are possible. The vertical wings are sent at certain angles with respect to the vehicle path in order to generate outward force which keeps the tether taut. This is essential for the vehicle to follow precisely an intended path needed for accurate mosaic photographs. FIG. 1 further shows that the vehicle 1 is attached to the tether 3 by an adjustable bridle 15 which permits to change the angle of the vertical wings relative to the tether. In this way the vertical wings generate the outward force as well as the vertical lift which counteract the weight of the vehicle in water. A ballast 17 can be added on the vehicle to further aid in counteracting. The vehicle therefore travels in a nearly flat orbit above the ocean floor. It is also possible to design the vertical wings so that the force generated by them can be divided into the outward force and a vertical lift to obtain level flight high above the floor.

The figure further includes another way of controlling the altitude. Shown in the Figure is an elevator 19 which is swingably attached to the vehicle. The elevator is spring biased to a certain neutral position. A flexible wand 21 is attached to the elevator and points downward to contact the ocean floor to change the angle of the elevator against the bias spring. If the vehicle goes closer to the floor the wand flexes and applies a force to the elevator which is rotated upwards thereby altering the trim of the vehicle causing it to rise. If the vehicle flies higher, and spring forces the elevator back to its neutral position and causes the vehicle to fly back down towards the floor.

The central unit 5 has a metering drum 23 to which the tether 3 is attached. The tether 3 can also be wound and unwound about the drum as the vehicle travels under water. Power pack 25 is provided to supply the power needed for operation of the whole system. A cradle is rotatable about the axis of the central unit and holds the vehicle when the tether is fully wound. A liftline 29 facilitates lowering and raising of the system. It can also be made to supply the power or command signals from the surface of water.

Figure 2:
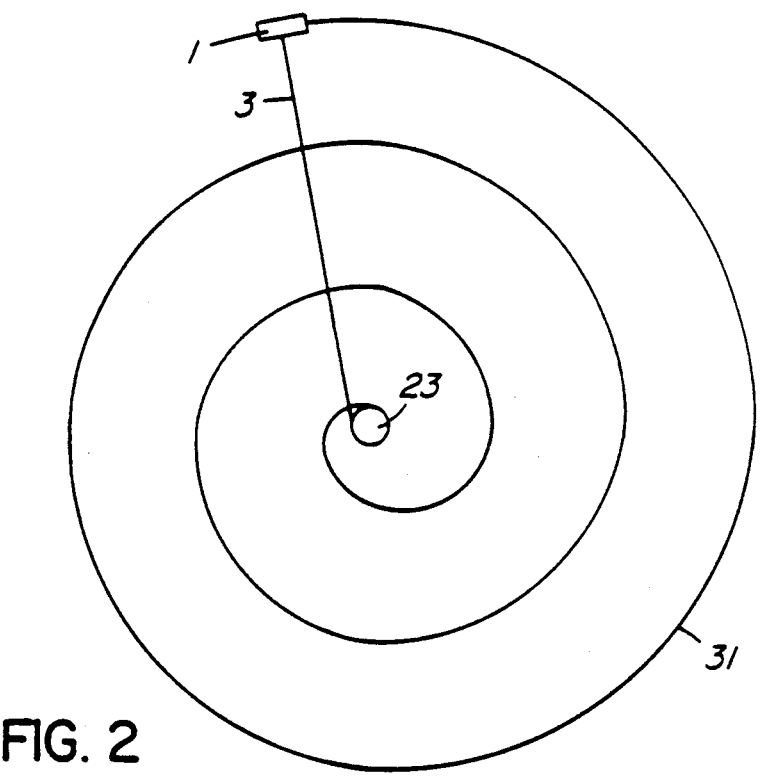
FIG. 2 is a typical pattern of track which the vehicle may follow.

Referring to FIG. 2, the metering drum is shown at 23 and has a predetermined diameter or circumference. The vehicle 1 is restrained by the tether 3. As the vehicle travels around the central unit, the tether is wound or unwound about the metering drum. The vehicle thus follows an ever-increasing circular path 31, called an involute. The vehicle will not therefore cover the same ground during each pass. The camera, timed to take photographs at the correct phasing, should therefore covers all of the ocean floor in a flight path. After reaching its full tether length the continuation of the flight will allow the tether to be rewrapped onto the drum (in the opposite lay) until the vehicle has reached the central unit. During this action a second series of photographs is produced which maybe used to check the validity of the outward run.

Figure 3:
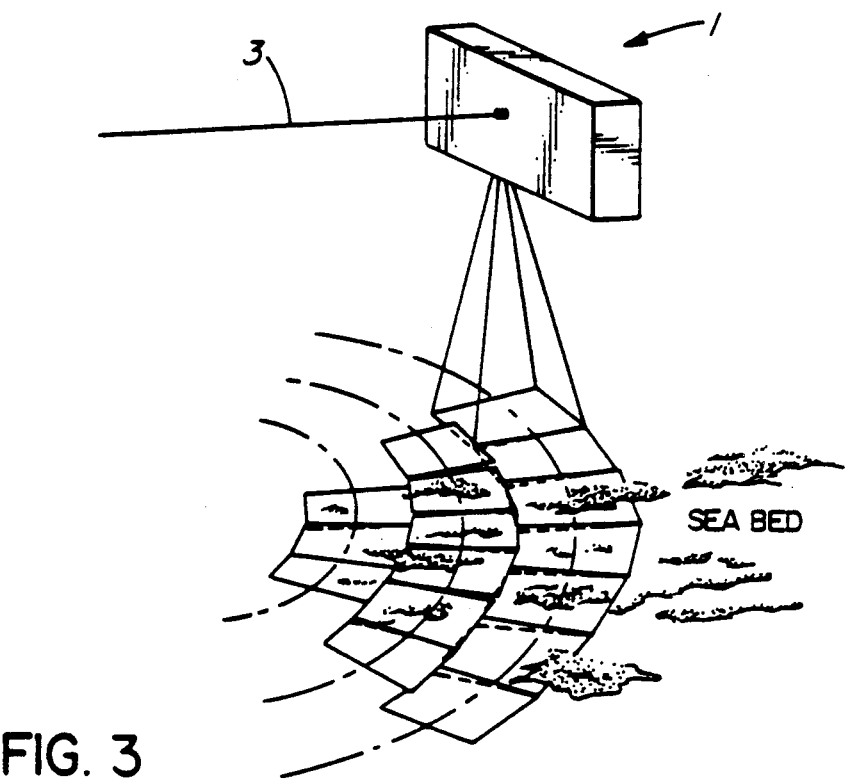
FIG. 3 is a schematic illustration of mosaic photographing.

Mosaic of photographs can be taken as shown in FIG. 3, in which the tether and vehicle are shown as located above the ocean floor indicating overlapping coverages of photographs.

The positional accuracy of each camera shot is dependent on several factors:
 (a) keeping the tether taut,
 (b) matching the drum diameter to the camera coverage,
 (c) positioning the camera at the correct height for its coverage,
 (d) the camera timing.

Figure 4:
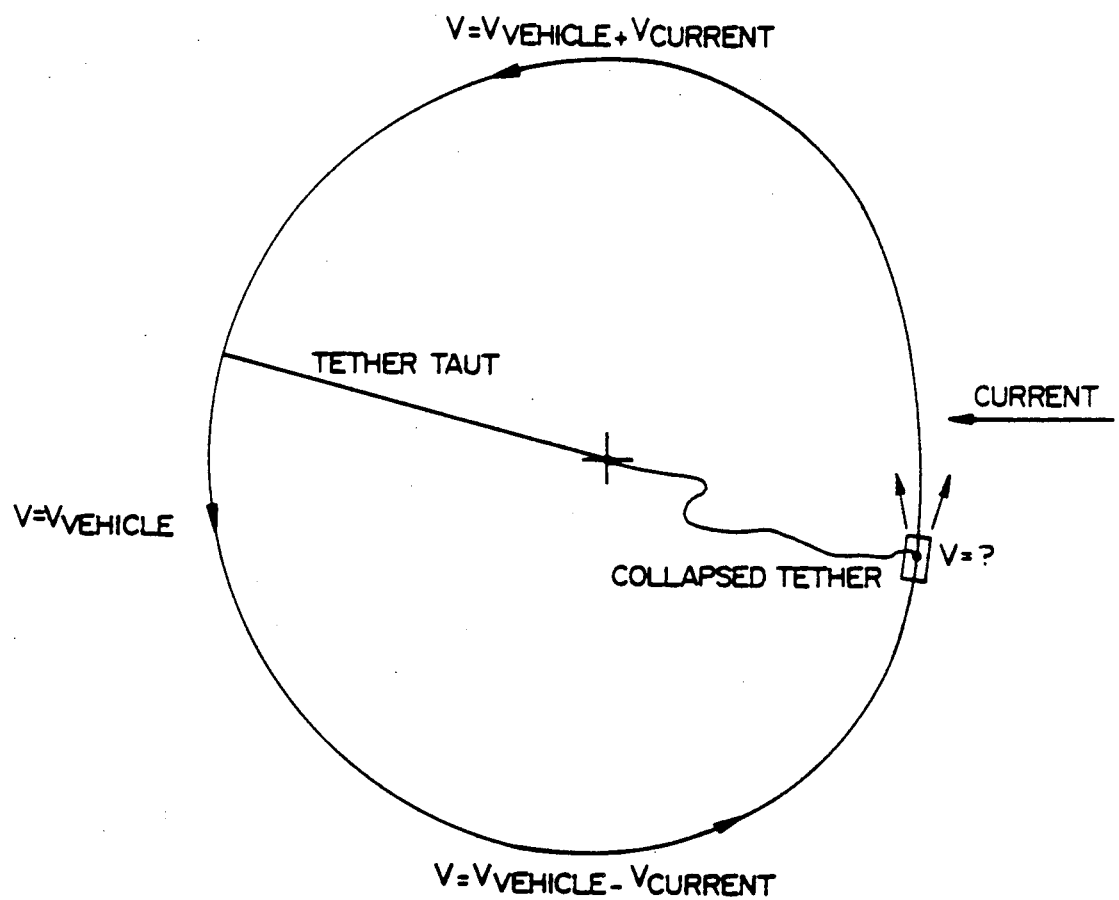
FIG. 4 shows a path which a conventional tethered vehicle may take if a simple cross-current exists.

Its is required for accurate operation of this invention that the tether must be keep as taut as possible. WHile the forming of a slight catenary will not cause gross errors insomuch as it will increase the overlap. Obviously a large atenary will cause the vehicle to rephotograph approximately the same circuit. To date tethered underwater vehicles are only able to trace a circular path around their central point in still waters. This path is due to the power (thrust) which is tangential to the radius. This prior art technique, however, is not reliable in the presence of any currents because a non-circular path is described when the vehicle is subjected to a current as shown in FIG. 4. Increasing the power will not change this path. As an alternative, offsetting the power unit so that the thrust is partly angled outwards will only have the effect of offsetting the collapse position because at some point there is a right angled current force that is not being opposed. THerefore other ways are needed if a complete circular path is required in the presence of any current. A method to overcome the problem would be the use of a second thruster set in line with the tether. Such a unit, however, would increase the drag and body size, be very expensive in power requirements and only be useful during part of the circuit. It has been concluded that the required outward force could be obtained by a multi-winged body which, due to its form and the presence of the wings, creates a positive lift outwards, thereby generating cable tension at all times, in much the same way as an aerofoil gives lift to cause flight. As with aerodynamic forms the lift (tension of tether) can be adjusted by the angle of attack of the wings thereby changing the drag. Lift therefore can be traded for forward velocity. In this manner, while there would be some increase in drag, the vehicle could be adjusted to orbit in a complete circular fashion in currents.

The first test of this concept was flat plate body held to tether by briddle of four lines, each line going to a corner of the plate. The flat body was in vertical plane, its angle of attack being greater than the tangential angle from the tether. Model and full-sized tests showed that while the concept appeared valid but inefficient, collapse did occur under strong current conditions. A full aerofoil wing shape did not give the expected results. After review and further research, which included testing of several full foil shape and forms, it was shown that a series of thin foil wings set in a "window blind" configuration and set at angles, was stable and efficient without collapse.

The correct distance (space) between each successive and incremental movement during rotation can be uniquely calculated. The distance required to obtain an overlap is a function of the camera width coverage at the correct height (focal length). This is achieved by the circumference of a drum being equal tot eh camera width coverage allowing for overlap distance required. Therefore as unwrapping occurs the tether length increases allowing the camera to move outward the correct distance. The drum is metered in aide of calculation of the length of the tether and camera width coverage overlap. This concept of mosaic sampling of data underwater can find many other applications in such areas as survey works with echo-sounding or biological net data gathering.

Contrary to other conventional techniques discussed above, the present system does not require the use of acoustical markers to obtain a series of photographs required to produce a mosaic. The device can be placed on the ocean bed without any prior preparation other than carrying out the normal site inspection by echo-sounder. SHould there be a requirement to return to the site at a later date, and/or link an adjacent area, then an acoustic beacon on the device and two on the ocean bed could be used to identify the position for future work. The total system is operation is, however, independent of a ship insomuch that after placement the device operation is automatic. The limitation of this concept is the length of tether that can be kept taut, the power and duration of the power pack, the film length, and the duration of the light source.

I claim:

1. An underwater control system for controlling the movement in a body of water of a submersible vehicle relative to a central unit, comprising;
    the said central unit which includes anchoring means thereon for fixedly placing the said central unit on the floor of the said body of water,
    a metering drum having a predetermined circumference provided on the said central unit,
    a tether to be wound and unwound about the said drum and having one end attached thereto,
    the said submersible vehicle connected to the other end of the said tether for travelling in the said body of water in a substantially spiral path about the said central unit as the said tether winds or unwinds,
    the said vehicle comprising propelling means for propelling the said submersible vehicle in the said body of water and a plurality of vertical wings to generate an outward force onto the said vehicle to maintain the said tether taut so that the said vehicle travels in the said substantially spiral path.

2. The underwater control system according to claim 1, wherein:
    the said vertical wings are shaped to generate a vertical lift in addition to the said outward force so as to maintain the said vehicle at a substantially constant altitude above the said floor as the said vehicle travels in the said spiral path.

3. The underwater control system according to claim 1, wherein:
    the said vertical wings are provided at an angle with respect to the said tether to generate a vertical lift in addition to the said outward force so as to maintain the said vehicle at a substantially constant altitude above the said floor as the said vehicle travels in the said spiral path.

4. The underwater control system according to claim 3, further comprising:
    a plurality of briddles adjustably connecting the end of the said tether and the said vehicle to vary the said angle of the said vertical wings so that the vertical lift can be adjusted.

5. The underwater control system according to claim 1, further comprising:
    altitude control means provided on the said submersible vehicle,
    the said altitude control means comprising:
    an elevator, and
    a bottom sensing spring rod attached to the said elevator.

6. The underwater control system according to claim 2, further comprising:
    a pair of end plates, and
    a plurality of the said vertical wings attached between the said pair of end plates in more than one row.

7. THe underwater control system according to claim 4, further comprising:
    a pair of end plates, and
    a plurality of the said vertical wings attached between the said pair of end plates in more than one row.

8. The underwater control system according to claim 5, further comprising:
    a pair of end plates, and
    a plurality of the said vertical wings attached between the said pair of end plate sin more than one row.

9. The underwater control system according to claim 6, further comprising:
    an underwater photographic equipment attached to the said vehicle to take mosaic photographs of the said floor.

10. The underwater control system according to claim 7, further comprising:
    an underwater photographic equipment attached to the said vehicle to take mosaic photographs of the said floor.

11. The underwater control system according to claim 8, further comprising:
    an underwater photographic equipment attached to the said vehicle to take mosaic photographs of the said floor.

* * * * *